United States Patent [19]

Szabo et al.

[11] Patent Number: 4,749,993
[45] Date of Patent: Jun. 7, 1988

[54] ARRANGEMENT FOR THE WIRELESS TRANSMISSION OF MEASURING SIGNALS

[75] Inventors: Zsolt Szabo, Stuttgart; Wolf-Dieter Poelsler, Rutesheim, both of Fed. Rep. of Germany

[73] Assignee: Dr. Ing. h.c.F. Porsche Aktiengesellschaft, Fed. Rep. of Germany

[21] Appl. No.: 825,351

[22] Filed: Feb. 3, 1986

[30] Foreign Application Priority Data

Feb. 1, 1985 [DE] Fed. Rep. of Germany ....... 3503347

[51] Int. Cl.⁴ .............................................. G08C 19/06
[52] U.S. Cl. .................................. 340/870.31; 340/58; 73/146.5
[58] Field of Search ............................. 340/58, 870.31; 73/146.5, 146.4

[56] References Cited

U.S. PATENT DOCUMENTS

| | | | |
|---|---|---|---|
| 4,067,235 | 1/1978 | Markland et al. | 73/146.5 |
| 4,071,724 | 1/1978 | Lejeune | 340/58 |
| 4,131,878 | 12/1978 | Yasuo | 340/58 |
| 4,300,118 | 11/1981 | Matsuda et al. | 73/146.5 |
| 4,319,220 | 3/1982 | Pappas et al. | 340/58 |
| 4,443,785 | 4/1984 | Speranza | 340/58 |
| 4,450,431 | 5/1984 | Hochstein | 340/870.31 |
| 4,467,641 | 8/1984 | Abraham | 340/58 |

FOREIGN PATENT DOCUMENTS 3403702  6/1985  Fed. Rep. of Germany ........ 340/58

Primary Examiner—John W. Caldwell, Sr.
Assistant Examiner—Tyrone Queen
Attorney, Agent, or Firm—Barnes & Thornburg

[57] ABSTRACT

An arrangement provides for the wireless transmission of a measuring signal from a sensor to an evaluating unit by a pair of first electrical coils that are temporarily inductively coupled with one another. The sensor is supplied with energy by a second pair of electrical coils that are also temporarily inductively coupled with one another. The sensor includes a power supply circuit means for receiving a low-frequency energy signal from the second pair of electrical coils and supplies an energy signal to a transmitting oscillator means. The transmitting oscillator means responds to at least one measured physical quantity and provides a medium-frequency measurement signal to be transmitted over the first pair of electrical coils. When used in a tire pressure control system, this arrangement provides for a reliable transmission of signals over a relatively large transmission path without strict mounting tolerances, while complying with governmental regulations.

27 Claims, 5 Drawing Sheets

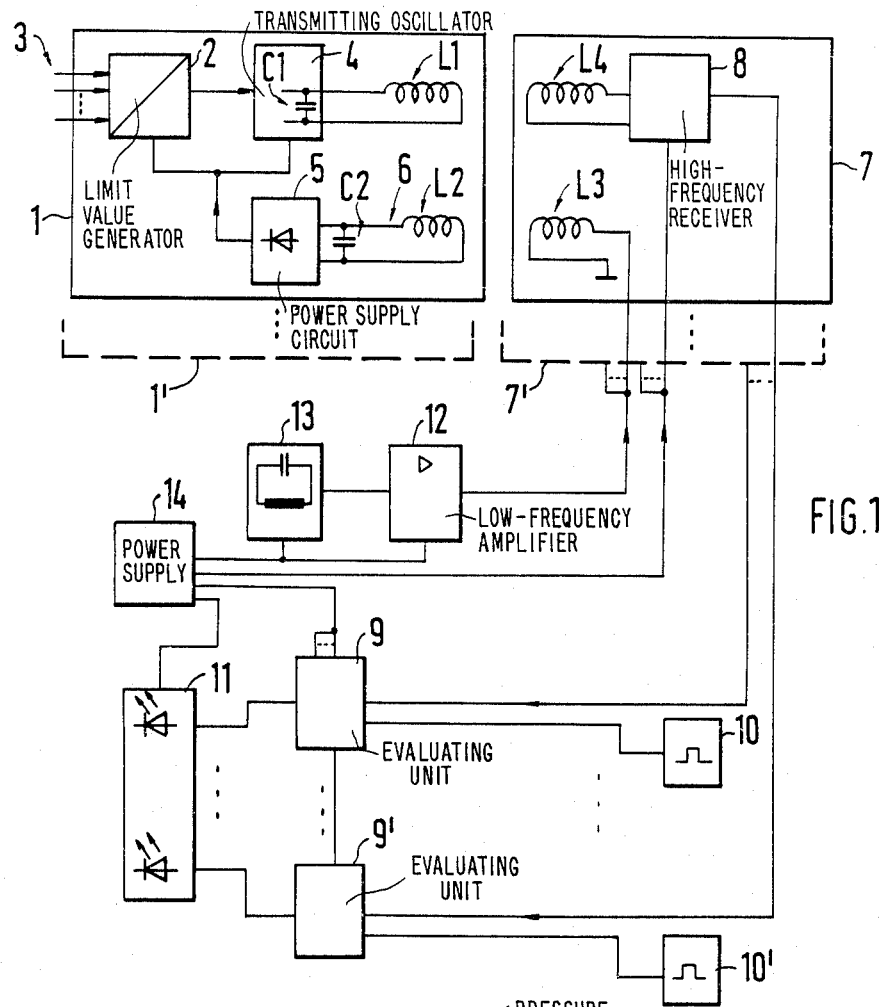
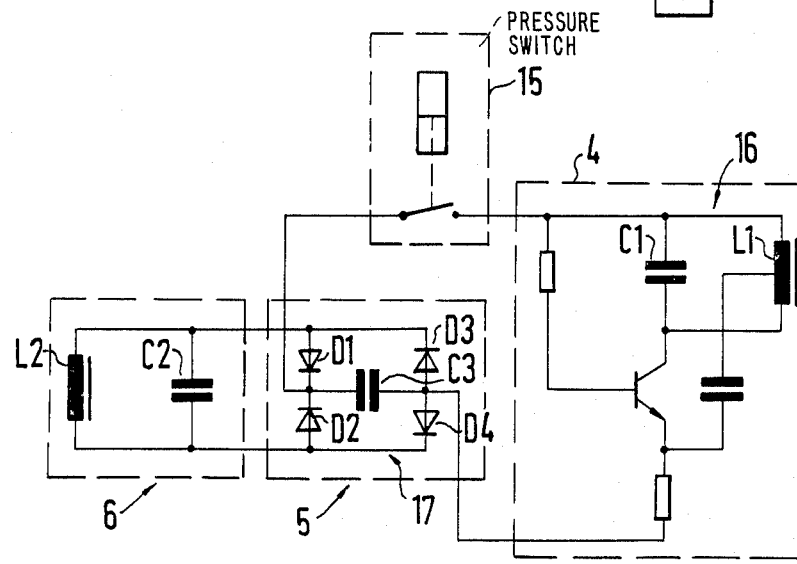

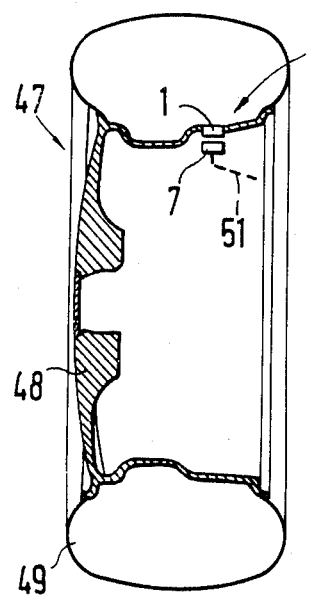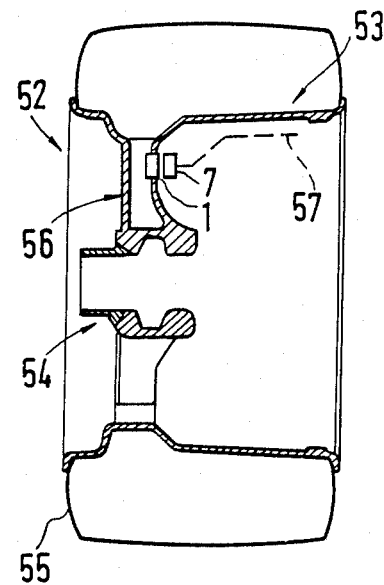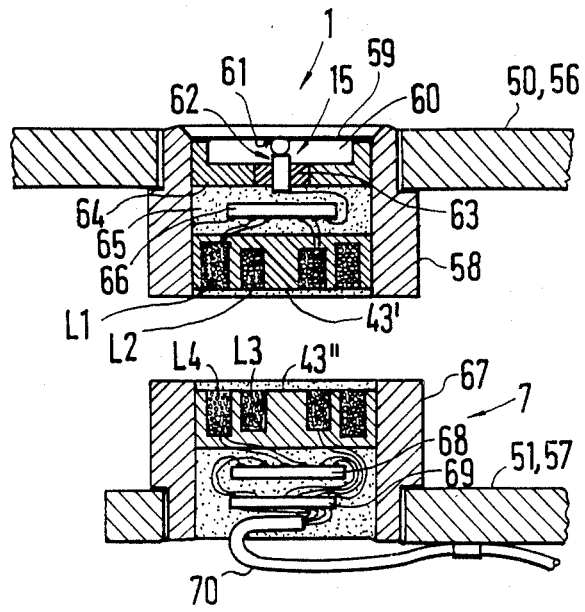

ARRANGEMENT FOR THE WIRELESS TRANSMISSION OF MEASURING SIGNALS

BACKGROUND AND SUMMARY OF THE INVENTION

This invention relates to an arrangement for the wireless transmission of a measuring signal from a sensor to an evaluating unit by a pair of first electrical coils that are temporarily inductively coupled with one another, the sensor being supplied with energy by a second pair of electrical coils that are also temporarily inductively coupled with one another.

Problems often occur in the transmission of the measuring signals of a sensor on a rotating part of a machine or a vehicle, such as a vehicle wheel, to an evaluating unit located on a part that is stationary with respect to the rotating part, such as a wheel carrier of a vehicle. Also, in addition to an errorless transmission of measuring signals, the compliance with governmental regulations is of great importance. Another problem is the often difficult supplying of the sensor with the energy required for its operation and for the transmission of the measuring signals since, for example, batteries in the sensor limit its freedom from maintenance. Also, at the site of the sensing and transmission of the measured value, high mechanical, chemical and thermal stresses occur frequently.

An indicating system for the tire pressure condition is shown in U.S. Pat. No. 4,450,431. In this system, a sine signal of 400 mw is generated at 9.5 mc/s and through a magnetic field is transmitted to a passive sensor. The passive sensor comprises a receiving oscillating circuit which, when the pressure switch is shut, supplies a transmitting oscillating circuit with energy through a diode. By means of the diode (diode multiplier), the energy signal is doubled and is emitted from the transmitting oscillating circuit to an E-field antenna of the evaluating unit.

It is a disadvantage of this system that the energy signal and the returned signal interferes with governmental radio communication significantly. The returned signal is also difficult to detect because with respect to frequency, it differs only by a factor of two from the energy signal. The evaluating unit therefore requires expensive filters.

In systems operating on the basis of suction circuits, such as the system shown in DE-OS No. 28 54 199 or the system described in the research report TV 7672 of the Federal Ministry for Research and Technology "Tire Characteristics and Driving Safety, Project Area I, Air Pressure Control System", pages 107 et seq., emissions and thus interferences with radio communication can be largely avoided. However, these tire control systems require a very small air gap between the sensor mounted on the side of the wheel (pressure switch) and the pick-up (high-frequency transmitter) arranged on the side of the wheel carrier. Also, the lateral offset must not exceed a narrow tolerance since otherwise the system would no longer be operable. The system is therefore susceptible to damage caused by flying rocks and adhering dirt or icing. It is also difficult to adjust when it is mounted during the manufacturing process and can be misadjusted and even destroyed during a tire change.

It is therefore an objective of the present invention to provide an arrangement for the wireless transmission of measuring signals that ensures a secure transmission of energy signals and measuring signals while complying with governmental regulations concerning radio communication, yet also permits a perfect detection of signals. A further objective is to make less critical the length of the transmission path (air gap) and the quality of the mounting tolerances, so as to provide an arrangement that is not susceptible to dirt and icing yet can also be manufactured in a simple and cost-effective manner.

These and other objectives are attained by the present invention providing in an arrangement for the wireless transmission of a measuring signal from a sensor to an evaluating unit, a sensor that includes a power supply circuit which receives a low-frequency energy signal from a second pair of electrical coils and supplies this signal to a transmitting oscillator. The transmitting oscillator responds to a measured physical quantity and provides a medium-frequency measurement signal to be transmitted over a first pair of electrical coils.

Further objects, features, and advantages of the present invention will become more apparent from the following description when taken with the accompanying drawings, which show for purposes of illustration only, an embodiment constructed in accordance with the present invention.

BRIEF DESCRIPTION OF THE DRAWINGS

FIG. 1 is a schematic circuit diagram of an arrangement for the wireless transmission of energy signals and measuring signals constructed in accordance with a preferred embodiment of the present invention;

FIG. 2 is a schematic circuit diagram of a tire pressure sensor of FIG. 1 and a pressure switch;

FIG. 9 is a preferred embodiment of the arrangement of the tire pressure sensor in a rim base of a vehicle wheel;

FIG. 10 is a further preferred embodiment of the arrangement of the tire pressure sensor in the wall of a rim spoke of a vehicle wheel; and FIG. 11 is a schematic sectional view of a tire pressure sensor and of a coupling element constructed in accordance with a preferred embodiment of the present invention.

DETAILED DESCRIPTION OF THE DRAWINGS

Figure 3:
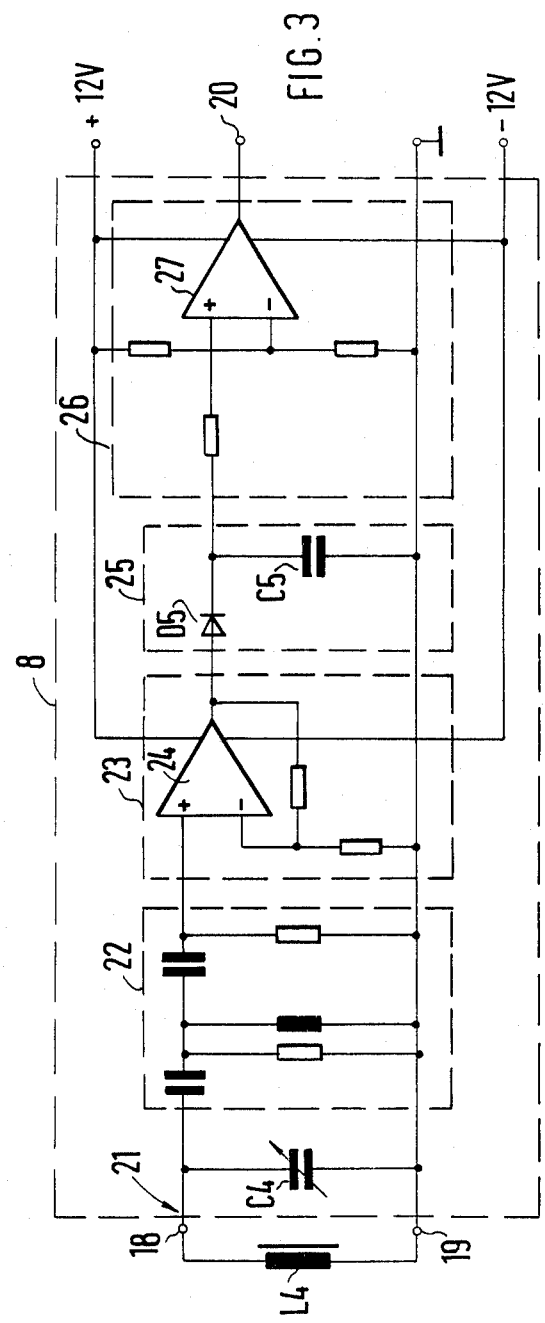
FIG. 3 is a schematic circuit diagram of the high-frequency receiver of FIG. 1.

In FIG. 1, a sensor, for example, of a tire pressure control system, has the reference number 1. A measuring transducer and limit value generator 2 transforms physical quantities 3 to be measured, such as pressure, temperature, etc., into control signals for a transmitting oscillator 4. The output oscillator circuit of the transmitting oscillator 4 is formed by a capacitor C1 and a transmitting coil L1. The energy supply of the measuring transducer and limit value generator 2 and the transmitting oscillator 4, is provided by a power supply circuit 5 that receives wirelessly transmitted energy from a secondary oscillating circuit 6 formed by a secondary coil L2 and a capacitor C2.

The sensor 1 is arranged on a rotating part of a machine or a vehicle, such as a vehicle wheel, and every rotation, passes once by a coupling element 7 that is arranged on a part that is stationary relative to the rotating part, such as a wheel carrier. The coupling element 7 comprises a primary coil L3 that is used for the inductive transmission of energy to the sensor 1; a receiver coil L4 that receives the signals of the transmitting oscillator 4 that are inductively transmitted by the transmitting coil L1; and a high-frequency receiver 8 connected to the receiver coil L4.

At the output of the high-frequency receiver 8, an evaluating unit 9 is connected that receives from an axle pulse generator 10 one pulse per rotation of the rotating part. The evaluating unit 9 controls an indicating unit 11. The primary coil L3 is controlled by a low-frequency amplifier 12 that amplifies an output signal of a low-frequency oscillator 13.

A constant power supply 14 supplies the high-frequency receiver 8, the evaluating unit 9, the indicating unit 11, the low-frequency amplifier 12 and the low-frequency oscillator 13 with the required operating energy.

When several rotating parts are monitored by multiple sensors 1 and 1', a coupling element 7 and 7' and an evaluating unit 9 and 9' is assigned to each sensor 1 and 1'. The primary coils L3, however, are supplied in parallel by only one low-frequency amplifier 12. In the same way, the energy supply takes place by the central power supply 14.

The low-frequency oscillator 13 operates preferably in a frequency range slightly below 10 kc/s (approximately 9.8 kc/s). In this frequency range, no power limitation because of governmental regulations is required so that the low-frequency signal can be amplified by the low-frequency amplifier 12 to a power level of about 2 to 10 watts.

The transmitting oscillator 4 in sensor 1 operates in a frequency range of medium wave lengths of about 700 kc/s. This frequency range makes it possible to keep the signal that is inductively coupled out by the transmitting coil L1 in the direction of the receiver coil L4 in a low power range so that practically no energy of this frequency is emitted. Thus, the governmental regulations will also remain unviolated by this operation.

The sensor 1 passes by the coupling element 7 once per rotation of the wheel. At the moment of the passing-by of the sensor 1 at the coupling element 7, the energy signal that is generated by the low-frequency oscillator 13 and amplified by the low-frequency amplifier 12 is transferred to the sensor 1 by the coupling element 7 via the pair of coils L3, L2. The transmitting oscillator 4 and/or the measuring transducer and limit value generator 2 is supplied with this energy. The transmitting oscillator 4 can then transmit its output signal via the pair L1, L4 of coils to the coupling element 7, where the measured information is detected and decoded. Then, through the evaluating unit 9 and the indicating unit 11 the decoded measured information is reported to the operator optically and/or acoustically.

FIG. 2 is a circuit diagram of a sensor 1 for a tire pressure control system that is equipped with a pneumatically operated pressure switch 15, the transmitting oscillator 4, the power supply circuit 5 and the secondary oscillating circuit 6. The pressure switch 15 monitors a limit value of a tire pressure and is preferably designed to be temperature-compensated. When the tire pressure is correct, the pressure switch 15 connects the transmitting oscillator 4 with the power supply circuit 5 and separates the connection when the tire pressure is below the limit value.

The transmitting oscillator 4 is installed in a known L-C Hartley circuit. The transmitting coil L1 in this case is a component of the oscillating circuit 16 of this L-C Hartley circuit arrangement that is constructed with the capacitor C1.

The secondary oscillating circuit 6 formed by the capacitor C2 and the secondary coil L2 supplies the received energy into a rectifier 17 of the power supply circuit 5. The rectifier 17, in a bridge connection, is constructed of diodes D1 to D4 and supplies to the transmitting oscillator 4, at its bridge diagonal, a direct current that is filtered by a capacitor C3.

FIG. 3 shows a circuit of the high-frequency receiver 8 in the coupling element 7, with input terminals 18, 19 to which the receiver coil L4 is connected and the output terminal 20 to which the evaluating unit 9 is connected.

A capacitor C4 connected in parallel to the receiver coil L4 can be adjusted, and together with the receiver coil L4, forms a receiving oscillating circuit 21 that is adjusted to the frequency of the transmitting oscillator 4.

The receiving oscillating circuit is followed by a high-frequency filter 22 in a T-network, the output signal of which is peaked with respect to the level by a high-frequency amplifier 23 that is constructed of an integrated circuit (LF 357 of Intersil Co.). The output signal, via a rectifier having a filter section 25 comprising of a diode D5 and a capacitor C5, is transmitted to a comparator 26 constructed of an integrated circuit 27 (LN 748 of Intersil Co.). The output terminal 20 of the comparator 26 is a perfect switch signal that indicates the condition of the pressure switch 15. The high-frequency amplifier 23 and the comparator 26 are supplied with the required operating energy by a constant polarity square wave voltage system (terminals at ±12 volts with respect to ground).

Figure 4:
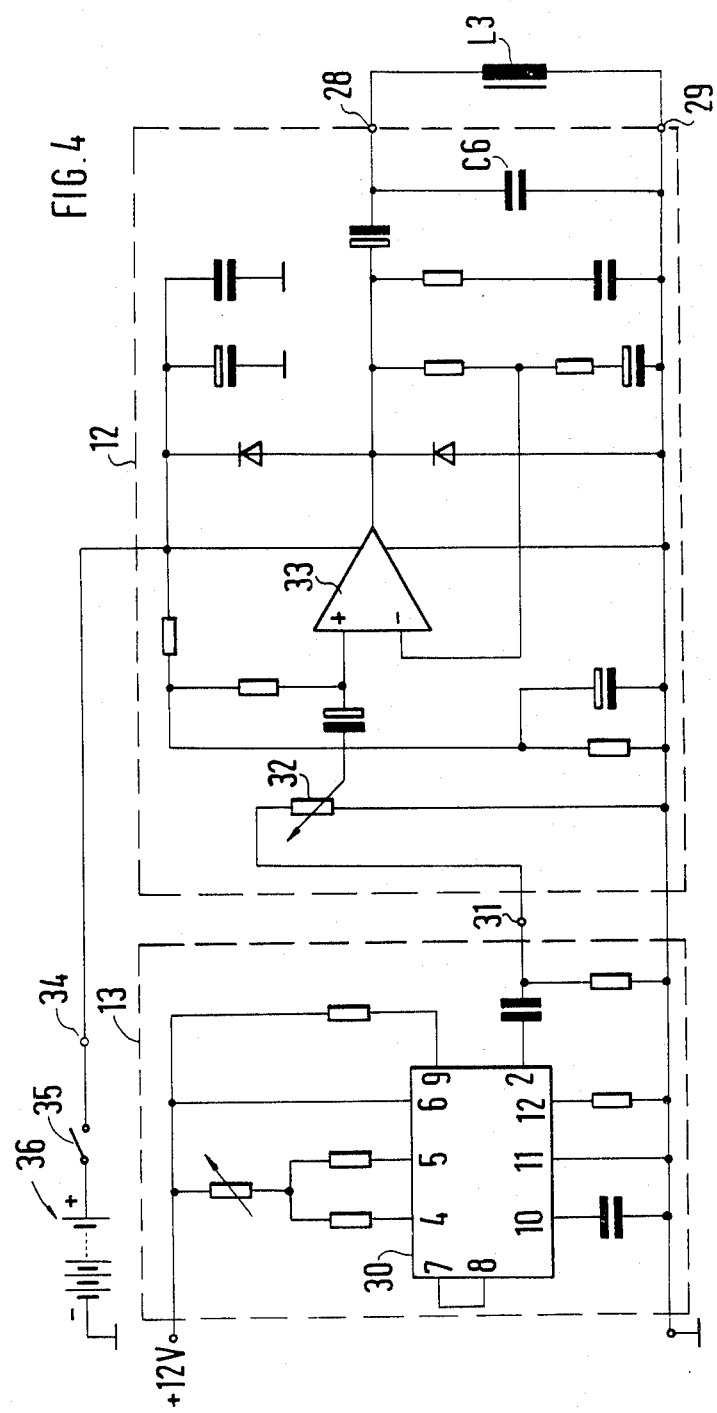
FIG. 4 is a schematic circuit diagram of the low-frequency oscillator, the low-frequency amplifier of the primary coil of FIG. 1.

FIG. 4 shows a low-frequency oscillator 13 and the following low-frequency amplifier 12 that follows. The primary coil L3 is connected at the terminals 28, 29.

The low-frequency oscillator 13, by means of an integrated circuit 30 (ICL 8038 of Intersil Co (precision oscillation generator)), is constructed with external elements required for its operation at 9.8 mc/s and receives its energy from the +12 volts with respect to ground of the constant polarity square wave voltage system.

The low-frequency amplifier 12 connected by an output terminal 31 of the low-frequency oscillator 13, at its input, has a voltage divider (potentiometer 32) and is based on an integrated circuit 33 (TDA 2030, for example, of Siemens Co.). In the case of a passenger car with four monitored wheels, its power should be about 2 to 10 watts. A capacitor C6 that is adjusted to natural frequency is connected in parallel to the primary coil L3. The amplifier, by a terminal 34 and an ignition switch 35, is connected directly to a non-constant vehicle supply system (battery 36).

Figure 5:
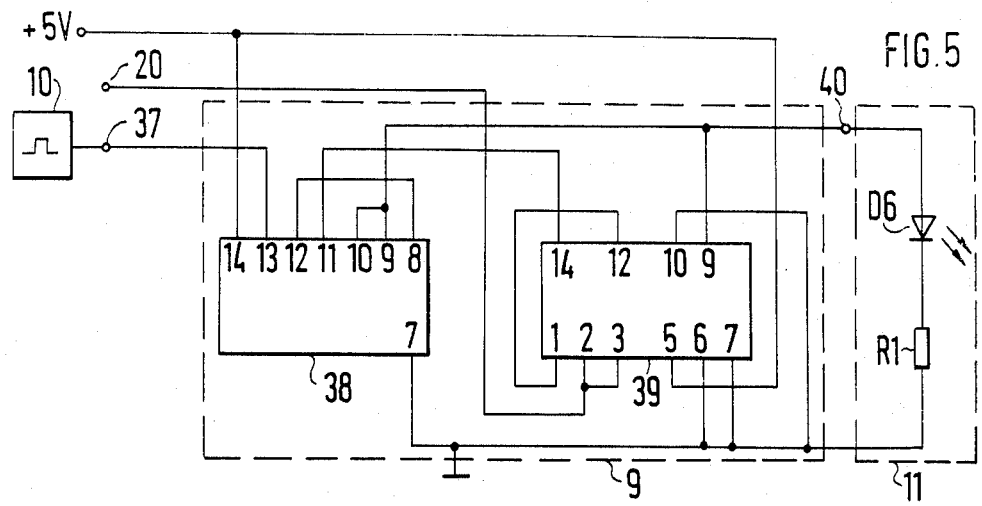
FIG. 5 is a schematic circuit diagram of the evaluating unit and the indicating unit of FIG. 1.

The circuit of an evaluating unit 9 shown in FIG. 5 through a terminal 37, receives from the axle pulse generator 10 one pulse per rotation of the wheel. The pulse is received by a first input (PIN 13) of a first NAND-element (realized by means of a logical unit 38 of an integrated circuit of the SN 7400 type, for example, of the Texas Instruments Co., having four NAND-elements). The output of the first NAND-element (PIN 11) is directed at the input (PIN 14) of a decimal counter 39 (IC unit of the SN 7490 type, for example, of Texas Instruments Co.). An output (PIN 9) corresponding to the count 2 of the counter 39, via a second NAND-element of the integrated circuit 38 (PINS 9, 10) that is switched as an inverter, is connected with the second input (PIN 8 on PIN 12) of the first NAND-element.

Backspace inputs (PINS 2, 3) of the decimal counter 39 are acted upon by the pulses of the output terminal 20 of the high-frequency receiver 8. The output (PIN 9) of the decimal counter 39 that corresponds to the count 2 of the counter 39, via a terminal 40, is switched to the indicating unit 11 for indicating a low pressure in the vehicle tire.

In the most simple case, the indicating unit 11 consists of a luminous diode D6 with a current limiting resistor R1 located in series with the luminous diode D6 and connected with respect to ground. On the side of the anode, the luminous diode D6 is connected to terminal 40.

The two integrated circuits are each supplied with operating energy with a stabilized TTL level of +5 volt with respect to ground.

The decimal counter 39, via the first NAND-member, receives one counting pulse respectively per rotation of the wheel from the axle pulse generator 10 and is set back by the output pulses of the high-frequency receiver 8. When the output pulses of the high-frequency receiver 8 do not occur, the decimal counter 39 counts upward and at the count 2 of the counter emits a signal that triggers the indicating unit 11 and suppresses further counting pulses, by switching the signal inverted by means of the second NAND-element to the second input of the first NAND-element.

Figure 6:
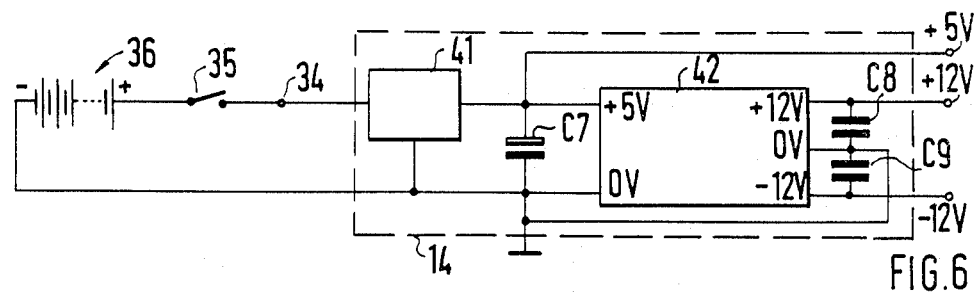
FIG. 6 is a schematic circuit diagram of a constant power supply.

The constant power supply 14 shown in FIG. 6, via the terminal 34 and the ignition switch 35, is connected to the battery 36 and with respect to ground. Through a 5-volt voltage regulator 41 (integrated circuit Type 7805, for example, of Motorola Co.) a TTL-level (+5 volts) with respect to ground is generated, a filter element C7 (capacitor) being connected in parallel with the output of said TTL-level. By means of the TTL-level, a constant-voltage direct-current converter 42, for example, of Syko Co., is operated which from the TTL voltage level generates a current supply system with a constant polarity square wave voltage (±12 volts) which through two filtering capacitors C8 and C9 is applied to ground.

Figure 7:
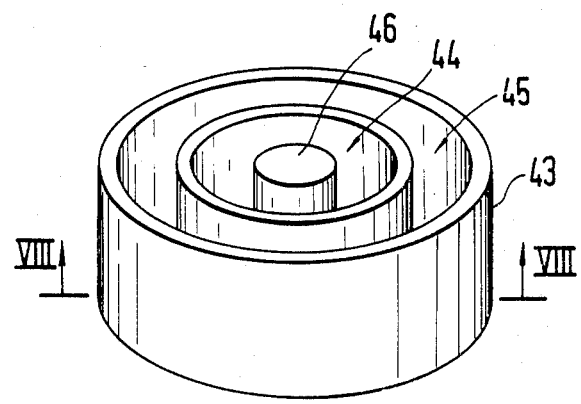
FIG. 7 is a perspective view of a double shell core.

The other FIGS. 7 to 11 show details of the mechanical construction and of the arrangement of parts of the system. FIG. 7 in this case shows a double shell core 43 of which one is arranged in the sensor 1 (43'), and another, in a mirror-inverted fashion to the double shell core 43', is housed in the coupling element 7 (43").

The double shell core 43 has an interior winding space 44 and a separate exterior winding space 45. The interior winding space 44 is provided for the low-frequency windings of the secondary coil L2 or primary coil L3, and the exterior winding space 45 is provided for the high-frequency windings of the transmitting coil L1 and the receiving coil L4. In the center of each double shell core 43, a central cylindrical core 46 is provided. A detailed explanation is provided in German application P No. 35 03 348.7.

Figure 8:
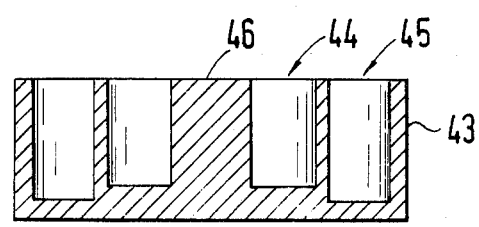
FIG. 8 is a section according to Line VIII—VIII of FIG. 7.

FIG. 8 is a sectional view along the Line VIII—VIII of the double shell core 43 of FIG. 7.

FIGS. 9 and 10 show two preferred embodiments of how the sensor 1 and the coupling element 7 may be arranged in a vehicle. FIG. 9 is a sectional view of a vehicle wheel 47 having a rim 48 and a tire 49. The sensor 1 is arranged in a rim base 50 and is preferably screwed or glued to it. The coupling element 7, by means of a symbolically drawn carrier 51 indicated by dashed lines, is fastened, for example, at a wheel carrier (not shown).

In the second preferred emodiment illustrated in to FIG. 10, a vehicle wheel of a different design 52 having a central shutter is shown in partial sectional view. A rim base 53 is connected with a wheel hub 54 by spoke-type hollow-chamber-shaped elements 56 that are open in the direction of the tire 55. The sensor 1 in this case is arranged in the wall of one of these elements 56. The coupling element 7, by a carrier element 57, is fastened at a wheel carrier (not shown).

Finally, FIG. 11 shows sectional views through a preferred embodiment of a sensor 1 and a coupling element 7. A sensor housing 58 that is screwed together with the rim base 50 and the spoke-type element 56 carries a pneumatically operated pressure switch 15, with an electrically conducting membrane 59 that is fastened in the sensor housing 58 in a ring-shaped manner. This membrane seals off a gas-filled reference pressure chamber 50 and, when the tire pressure is sufficient, with a switching surface 61, rests against a switching contact 62. When the tire pressure is too low, the switching surface 61 is detached from switching contact 62 so that the power supply of the transmitting oscillator 4 is interrupted. The switching contact 62 is fastened in an insulating piece 63 and a carrier piece 64 in the sensor housing 58. Below the switching contact 62, a space 65 is connected in the sensor housing 58 in which the electronic components of parts of the transmitting oscillator 4, of the supply circuit 5 and of the secondary oscillating circuit 5 are housed. These are advantageously housed on a joint integrated circuit 66, for example, in the thick-film hybrid technology, which is connected to the switching contact 62, the sensor housing 58, the transmitting coil L1 and the secondary coil L2. The transmitting coil L1 and the secondary coil L2 are arranged in the double shell core 43' and are cast together with it and the integrated circuit 65 by means of an electrically synthetic resin in the sensor housing 58.

The coupling element 7 is constructed by means of a housing 67 and is preferably screwed together with a carrier 51 or carrier element 57. The receiver coil L4 and the primary coil L3 are arranged in the double shell core 43" and are cast together with it. The electrical components of the high-frequency receiver 8 are preferably constructed as an integrated circuit 68 in thick-film hybrid technology, which is cast with a connecting plate 69, parts of a connection 70, the receiver coil L4, the primary coil L3 and the double shell core 43" by means of an electrically insulating synthetic resin.

The described system for the measured-value transmission on the example of a tire pressure control system can be adapted and expanded corresponding to the fields of application.

For example, in the case of a tire pressure control system, it may be useful to monitor two limit values of the tire pressure at differing levels since the tire pressure must be adapted to the different stresses to the vehicle.

In that case, two sensors are arranged in the rim base on a joint axis that is vertical to the axle of the wheel. As a result, kinetic balancing problems are eliminated without further measures. The reference pressure chambers of the sensors are provided with a pressure of a varying level so that, when the tire pressure that corresponds to the higher limit value two pulses are emitted. When the tire pressure is between the two limit values, only one pulse is emitted and below that, no pulse is emitted. The electronic evaluating system must also be adapted correspondingly. The evaluation of the pulses will then be carried out by a microcomputer.

It is also conceivable to acquire values of one or more physical quantities analogously in the sensor and to modulate or code the transmitted signal as a function of the physical quantitiies. Then, instead of the comparator 26, a demodulator or decoder is required in the coupling element 7 which demodulates or decodes the received signal and changes it into signals that are proportional to the measured physical quantities.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement including a sensor and an evaluating unit for the wireless transmission of at least one measuring signal from said sensor and to said evaluating unit by a pair of first electrical coils that are at least temporarily inductively coupled with one another, said sensor being supplied with energy by said evaluating unit via a second pair of electrical coils including primary and secondary coils and connected to said evaluating unit that are temporarily inductively coupled with one another, wherein said sensor includes a power supply circuit means connected to said second pair of electrical coils for receiving a low-frequency energy signal from said second pair of electrical coils for supplying an energy signal to a transmitting oscillator mean, and transmitting oscillator means responding to at least one measured physical quantity and providing a medium frequency measurement signal to be transmitted over said first pair of electrical coils to said evaluating unit, wherein:
   the frequency of said energy supply signal transmitted between said second pair of electrical coils is below 10 kc/s;
   said power supply means has at least one secondary oscillating circuit with means for adjusting said secondary oscillating circuit to the frequency of an energy supply signal supplied by said second pair of electrical coils;
   said secondary oscillating circuit includes a capacitor connected in parallel to said secondary coil which is connected in parallel to a rectifier bridge that has a filter capacitor as its diagonal bridge;
   wherein said sensor is arranged on a machine part which rotates relative to a coupling part which is arranged on a stationary part of the machine; and
   wherein said high-frequency receiver is comprised of a variable capacitor connected in parallel with said receiver coil and with said receiver coil forms a receiver oscillating circuit; a high-frequency filter connected to said variable capacitor; a high-frequency amplifier connected to said high-frequency filter, and a rectifier connected to said high frequency amplifier, said rectifier having a filter capacitor, and a comparator means connected to said filter capacitor for comparing the voltage at said filter capacitor with a reference voltage.

2. An arrangement including a sensor and an evaluating unit for the wireless transmission of at least one measuring signal from said sensor and to said evaluating unit by a pair of first electrical coils that are at least temporarily inductively coupled with one another, said sensor being supplied with energy by said evaluating unit via a second pair of electrical coils connected to said evaluating unit that are temporarily inductively coupled with one another;
   wherein said sensor includes a power supply circuit means connected to said signal pair of electrical coils for receiving a high power, low-frequency energy signal from said second pair of electrical coils for supplying an energy signal to a transmitting oscillator means, said transmitting oscillator means responding to at least one measured physical quantity and providing a low power, medium frequency measurement signal to be transmitted over said first pair of electrical coils to said evaluating unit;
   wherein said sensor and evaluation unit each include a double shell core having a cylindrical core and two concentric pot-shaped shells that form concentric exterior and interior winding spaces, one of said winding spaces receiving one of said coils from said first pair of electrical coils and the other of said winding spaces receiving one of said coils from said second pair of electrical coils.

3. The arrangement of claim 2, wherein the frequency of said energy supply signal transmitted between said second pair of electrical coils is below 10 kc/s.

4. The arrangement of claim 2 further including a coupling part which includes a primary coil of said second pair of electrical coils and a receiver coil of said first pair of electrical coils, and a high-frequency receiver connected to said receiver coil.

5. An arrangement including a sensor and an evaluating unit for the wireless transmission of at least one measuring signal from said sensor and to said evalutaing unit by a pair of first electrical coils that are at least temporarily inductively coupled with one another, said sensor being supplied with energy said evaluating unit via a second pair of electrical coils connected to said evaluating unit that are temporarily inductively coupled with one another;
   wherein said sensor includes a power supply circuit means connected to said second pair of electrical coils for receiving a high power, low-frequency energy signal from said second pair of electrical coils for supplying an energy signal to a transmitting oscillator means, said transmitting oscillator means responding to at least one measured physical quantity and providing a low power, medium frequency measurement signal to be transmitted over said first pair of electrical coils to said evaluating unit;
   a pulse generator means for sending an electrical signal pulse to said evaluating unit for each revolution of said sensor relative to said evaluating unit;
   detector means for sending a detection signal to said evaluating unit upon detecting a measurement signal on said first pair of electrical coils;
   said evaluating unit generating an output signal when a preset number of pulses have been received from said ppulse generator means after a detection signal from said detector means.

6. The arrangement of claim 1 further including an axle pulse generator means for sending an electrical signal pulse to said evaluating unit and an indicating unit which receives control signals from said evaluating unit, said evaluating unit sending said control signals in response to said electrical signal pulse and electrical signals received from said comparator.

7. The arrangement of claim 6, wherein said evaluating unit is comprised of a counter connected in series with a logical unit, said counter counting said electrical signal pulses from said axle pulse generator and being set back by pulses from said high-frequency receiver.

8. The arrangement of claim 7, further including logic means for blocking pulses from said axle pulse generator means and activating said indicating unit when said pulses from said high-frequency receiver do not occur and a predetermined count of said counter is reached.

9. The arrangement of claim 2, wherein said sensor includes one of said double shell cores, said double shell core having received a secondary coil of said second pair of electrical coils and a transmitting coil of said first pair of electrical coils.

10. The arrangement of claim 2, wherein said interior winding space receives one of said second pair of electrical coils and said exterior winding space receives one of said pair of electrical coils.

11. The arrangement of claim 2, including means for casting said electrical coils together with said double shell cores, said casting means being a temperature resistant mass of synthetic resin.

12. The arrangement of claim 1, futher including a low-frequency oscillator means for generating an energy signal; a low-frequency amplifier means connected to said low-frequency oscillator means for amplifying said energy signal, and supplying said amplified energy signal to said primary coil of said second pair of electrical coils.

13. The arrangement of claim 2, wherein said power supply circuit means has at least one secondary oscillating circuit with means for adjusting said secondary oscillating circuit to the frequency of an energy supply signal supplied by said second pair of electrical coils.

14. The arrangement of claim 2, wherein said secondary oscillating circuit includes a capacitor connected in parallel to a secondary coil which is connected in parallel to a rectifier bridge that has a filter capacitor as its diagonal bridge.

15. The arrangement of claim 1, wherein said sensor is arranged in a rim base of a vehicle wheel.

16. The arrangement of claim 1, wherein said sensor is arranged in a spoke-type hollow-chamber-shaped element of a vehicle wheel that is open in the direction of the tire and connects a rim base with a wheel hub.

17. The arrangement of claim 1, wherein the frequency of said transmitting oscillator is approximately 700 kc/s and the frequency of an energy signal supplied by said second set of electrical coils is approximately 9.8 kc/s.

18. The arrangement of claim 1, wherein said transmitting oscillator is an L-C Hartley circuit.

19. The arrangement of claim 2, wherein said sensor is arranged on a machine part which rotates relative to a coupling part which is arranged on a stationary part of the machine.

20. The arrangement of claim 19, wherein said coupling part comprises several receiver coils of said first set of electrical coils and several high-frequency receivers selectively adjusted to various frequencies.

21. The arrangement of claim 20, wherein a plurality of sensors are arranged at said rotating part for monitoring varying limit values of said measuring signals.

22. The arrangement of claim 21, wherein said transmitting oscillators of said plurality of said sensors are adjusted to the same frequency and said evaluating unit monitors the non-occurrence of individual pulses from said transmitting oscillators.

23. The arrangement of claim 21, wherein said transmitting oscillators of said sensors operate at different frequencies.

24. The arrangement of claim 1, including means for modulating said transmitting oscillator as a function of a measuring-signal and said high-frequency receiver comprises a demodulator that outputs a measuring-signal proportional value for further processing by said arrangement.

25. The arrangement of claim 24, including means modulating said transmitting oscillator as a function of the pressure and temperature.

26. The arrangement of claim 1, wherein said sensor includes a pneumatically operable pressure switch means for the monitoring of said tire pressure.

27. The arrangement of claim 26, wherein said pressure switch mean is comprised of an electrically conducting membrane fastened to a sensor housing and closes a reference pressure chamber in said housing from the interior of the tire, and a switching contact which rests against a surface of said membrane when the air pressure in said tire is equal to or above an indicated value, and lifts off the switching contact causing an electrical circuit to open between said power supply circuit means and said transmitting oscillator when the air pressure in said tire falls below said indicated value.

* * * * *